US012370826B1

(12) United States Patent
Hibler

(10) Patent No.: US 12,370,826 B1
(45) Date of Patent: Jul. 29, 2025

(54) BONDED BILAYER WRAP FOR PAINT BRUSHES, ROLLERS, AND OTHER ITEMS

(71) Applicant: Wacky Wrap, LLC, Powell, OH (US)

(72) Inventor: Stanley A. Hibler, Pickerington, OH (US)

(73) Assignee: Wacky Wrap, LLC, Powell, OH (US)

(*) Notice: Subject to any disclaimer, the term of this patent is extended or adjusted under 35 U.S.C. 154(b) by 79 days.

(21) Appl. No.: 18/457,613

(22) Filed: Aug. 29, 2023

Related U.S. Application Data

(60) Provisional application No. 63/377,354, filed on Sep. 28, 2022.

(51) Int. Cl.
*B65D 81/24* (2006.01)
*A46B 17/04* (2006.01)
*B44D 3/00* (2006.01)
*B44D 3/12* (2006.01)

(52) U.S. Cl.
CPC .............. *B44D 3/125* (2013.01); *A46B 17/04* (2013.01); *B44D 3/006* (2013.01); *A46B 2200/202* (2013.01)

(58) Field of Classification Search
CPC ........ B44D 3/123; B44D 3/125; B44D 3/006; A46B 17/04; A46B 2200/202
USPC ....... 206/209, 361, 362.2, 362.3, 362.4, 423
See application file for complete search history.

(56) References Cited

U.S. PATENT DOCUMENTS 2,533,829 A * 12/1950 Merryweather ..... B65D 33/165 383/71
4,881,278 A * 11/1989 Farah .................. A47K 13/302 206/209
4,967,903 A * 11/1990 Kettle .................... B44D 3/006 206/209
5,887,708 A * 3/1999 Gonzales ................. B44D 3/02 206/349
6,757,931 B2 * 7/2004 Nordstrom ............. A46B 17/04 15/248.1
7,537,111 B2 * 5/2009 Hart ..................... B65D 33/004 206/209
11,241,086 B1 * 2/2022 Sholeen ................. B44D 3/125
2005/0082197 A1 * 4/2005 Carol ...................... B65D 27/04 206/81
2005/0145518 A1 * 7/2005 Hong ..................... B44D 3/123 206/361

* cited by examiner

*Primary Examiner* — Luan K Bui
(74) *Attorney, Agent, or Firm* — Emerson, Thomson & Bennett, LLC; Roger D. Emerson; Peter R. Detorre

(57) ABSTRACT

A bonded bilayer sheet is formed from an inner absorbent sheet bonded with an adhesive to an outer metal foil layer, desirable aluminum foil. The inner absorbent layer is suitable for items even that are messy, such as paint, due to its ability to absorb the paint or other liquid that is contained in/on the item requiring wrapping. In order to hold the inner absorbent layer in place, the outer metal foil can be formed about the item being wrapped (crushed) to keep the absorbent layer in contact with the item and to exclude air. Obviously, this bonded bilayer sheet finds great utility for wrapping paint brushes, paint rollers, paint roller trays, and a host of like items so that the items can be set aside for a few hours or even a few days and the user return to find the items in suitable condition to be reused.

18 Claims, 4 Drawing Sheets

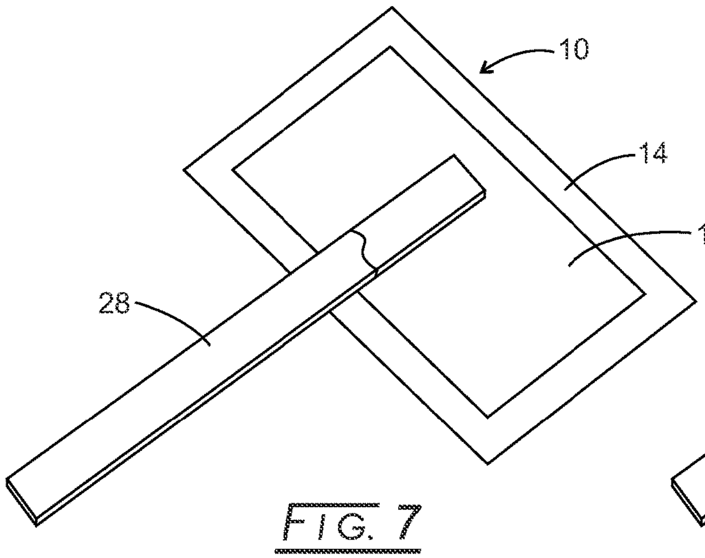
FIG. 7
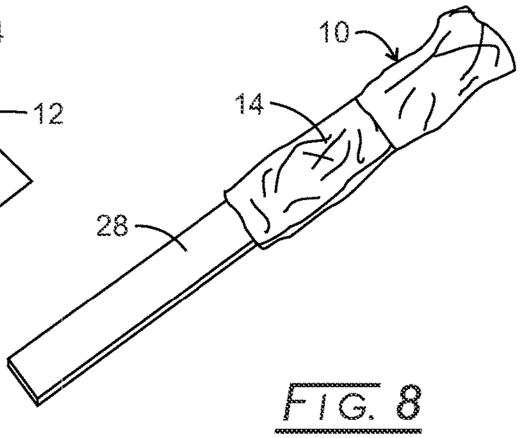
FIG. 8
FIG. 9
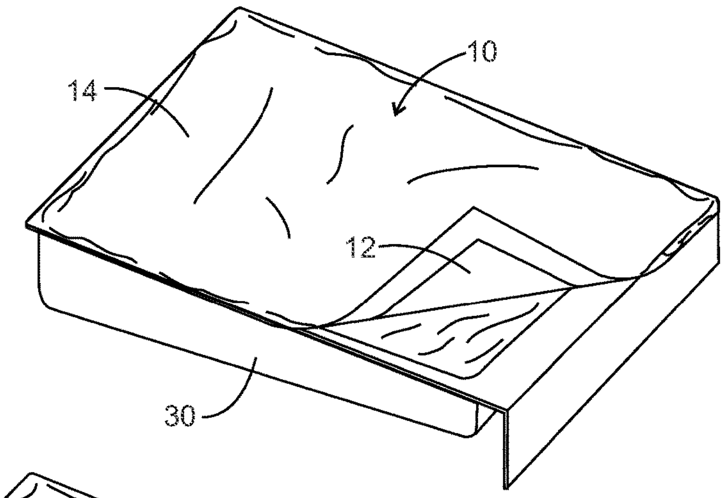
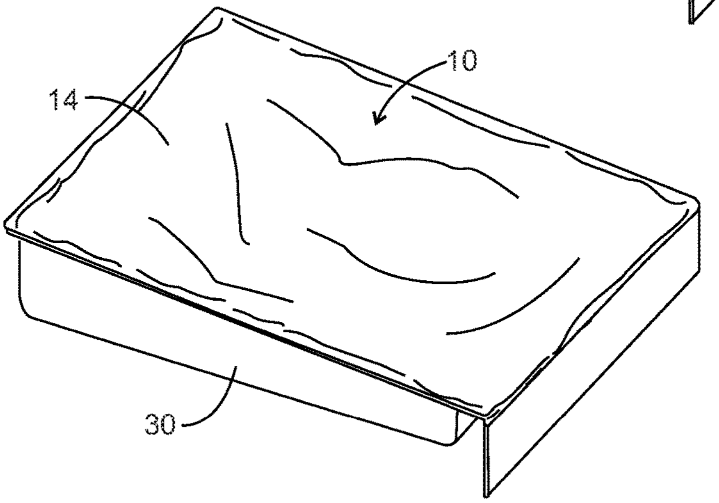
FIG. 10

BONDED BILAYER WRAP FOR PAINT BRUSHES, ROLLERS, AND OTHER ITEMS

CROSS-REFERENCE TO RELATED APPLICATIONS

This application claims benefit of provisional application No. 63/377,354 filed on Sep. 28, 2022.

STATEMENT REGARDING FEDERALLY SPONSORED RESEARCH AND DEVELOPMENT

Not applicable.

THE NAMES OF THE PARTIES TO A JOINT RESEARCH AGREEMENT

Not applicable.

REFERENCE TO A "SEQUENCE LISTING," A TABLE, OR A COMPUTER PROGRAM

Not applicable.

STATEMENT REGARDING PRIOR DISCLOSURES BY THE INVENTOR OR A JOINT INVENTOR

Not applicable.

BACKGROUND OF THE INVENTION

Often, painters want to take a break from painting; yet, they need to be able to come back at a later time or even a day or two later to resume painting, desirably with the same brush or roller (painting instrument or painting applicator). The challenge is to store the painting instrument so that air (actually, oxygen for latex paints) or evaporation for oil-based paints does not set (cure) the paint making it difficult at best to continue using the same painting instrument (e.g, roller, paint brush, or the like) at a later time.

Some painters resort to storing the painting instruments in a freezer or refrigerator. While such cold temperatures retard setting (coalescing for latex paints); oxygen still is present. It is to this challenge that the present invention is based.

BRIEF SUMMARY OF THE INVENTION

A registered, desirably bonded, bilayer sheet is formed from an inner absorbent sheet bonded with an adhesive to an outer metal foil layer, desirable aluminum foil. The inner absorbent layer is suitable for items even that are messy, such as paint, due to its ability to absorb a bit of the paint or other liquid that is contained in/on the item requiring wrapping. In order to hold the inner absorbent layer in place, the outer metal foil can be formed about the item being wrapped (crushed) to keep the absorbent layer in contact with the item and to exclude air and to remain in place about the wrapped instrument. Obviously, this bonded bilayer sheet finds great utility for wrapping paint brushes, paint rollers, paint roller trays, and a host of like items so that the items can be set aside for a few hours or even a few days and the user return to find the items in suitable condition to be reused. This is quite beneficial for a painter who wants to take a lunch break or return the next day to continue work. The painter, then, does not have to go through the rigor of cleaning the brush or roller cover each time the items are used.

BRIEF DESCRIPTION OF THE SEVERAL VIEWS OF THE DRAWINGS

For a fuller understanding of the nature and advantages of the present method and process, reference should be had to the following detailed description taken in connection with the accompanying drawings, in which:

FIG. 7 is an isometric view of a used paint stirrer placed atop a sheet of the bilayer wrap;

FIG. 8 is an isometric view of the paint stirrer of FIG. 7 where the bilayer wrap has been tightly wrapped about the paint stirrer;

FIG. 9 is an isometric view of a paint roller tray with a sheet of the bilayer wrap being positioned atop the paint roller tray;

FIG. 10 is an isometric view of a paint roller tray of FIG. 9 with the sheet of the bilayer wrap being secured to the paint roller tray;

The drawings will be described in greater detail below.

DETAILED DESCRIPTION OF THE INVENTION

The bilayer wrap disclosed herein has an inner absorbent layer intended to be in contact with the paint brush, paint roller, paint roller cover, paint stirrer or a host of other items requiring to be wrapped/sealed within a sheet for storage of the item for a few hours on up to days. The absorbent layer may be used dry or wet with water (for latex paint) or with a solvent (for oil-based paint). In some circumstances, the bonded bilayer wrap can be reused, but often is disposable. An additive to retard moisture evaporation even can be added. While the two layers need only be in registry sufficient to wrap the object desired to be wrapped, without being held together the layers may shift resulting in an ineffective wrapping of the paint brush/roller or other object. Thus, a bonded bilayer construction may find wider market acceptance.

The problem with an absorbent sheet is that it cannot be wrapped about the item and stay. Absorbent sheets from paper towels to chamois cloths to a variety of different absorbent sheets have this issue. Rather than tying the absorbent sheet with string or rubber bands that work to varying degrees, a second layer has been secured to the inner absorbent layer preferably with an adhesive. This outer layer is made from a very thin sheet of metal, typified by aluminum foil, which can be formed about the item and stay in that position to keep the inner absorbent layer in contact with the paint brush, paint roller, or other item requiring storage. The outer metal layer or foil also effectively excludes air, moisture, dirt, and like materials that would compromise the wrapped item. You might say that the outer metal foil is "crushable" about the item for making the metal foil conform for storage. The wrapped brush or roller cover/frame is much easier to handle since the user is grasping the outer metal foil. The user's hand stays clean, while any paint on the brush or roller cover is captured by the inner absorbent layer.

Figure 1:
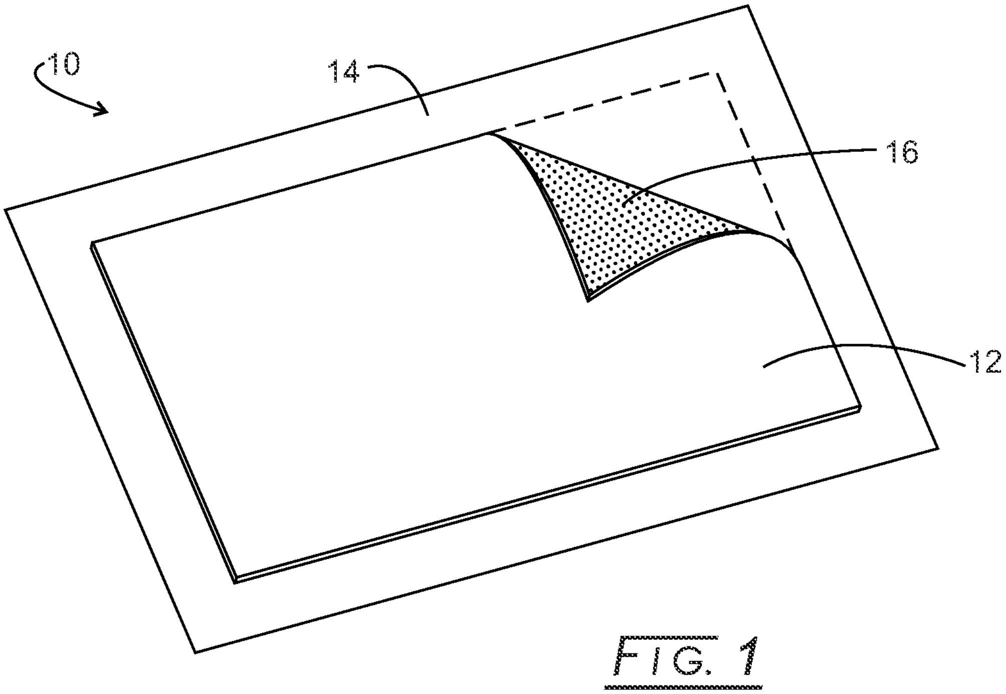
FIG. 1 is an isometric view of the wrap of this invention with the bonding layer partially removed.
Figure 2:
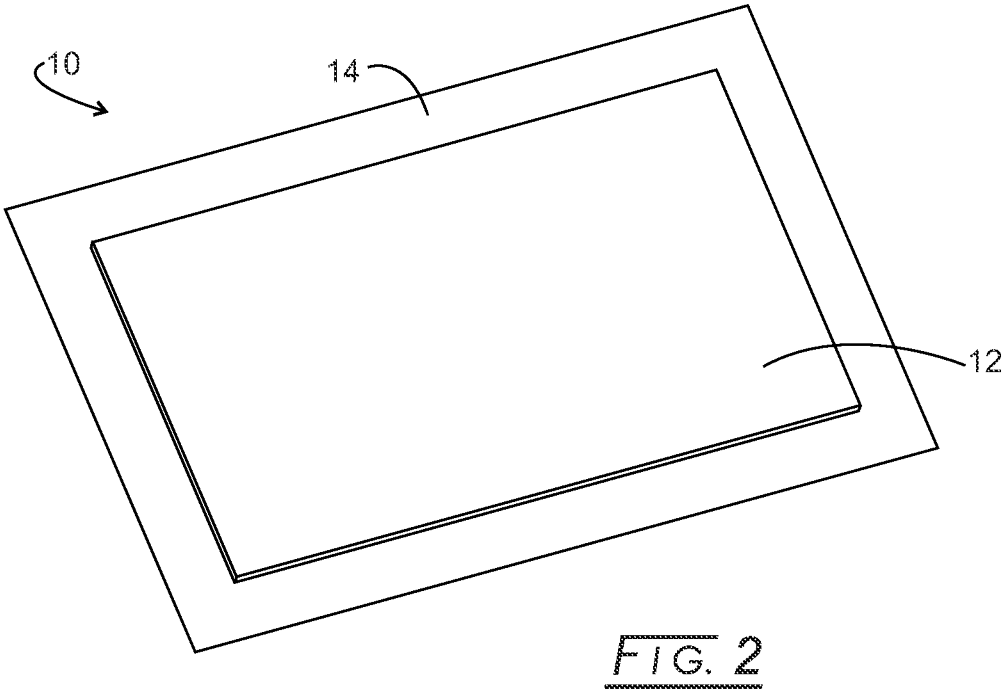
FIG. 2 is another isometric view showing the bilayer wrap disclosed herein.

Referring now to FIGS. 1 and 2, a bilayer sheet, 10, is seen to have an inner layer, 12, of a paper towel or paper towel-like absorbent layer and an outer layer, 14, of metal foil form the bilayer wrap disclosed herein. Desirably, bilayer sheet 10 and metal foil layer 14 are bonded together with a bonding layer, 16, of pressure sensitive adhesive, adhesive transfer tape, or other bonding/adhesive layer for firmly securing bilayer sheet 10 and metal foil layer 14 together; although, the deformable outer foil can be secured in position without being bonded/adhered to the inner absorbent layer due to its ability to stay/remain in its conforming position. A variety of adhesive materials will be apparent to the skilled artisan. FIG. 2 illustrates the bonded final bilayer product of this invention.

Rather than paper towel for sheet 12, other pulp or non-woven air laid material could be substituted for the paper towel sheet. A variety of these sheets are commercially available and suitable for use here. Desirably, the inner sheets are wetted for assisting in preventing the sheets from sticking to the roller covers or paint brush bristles.

Figure 3:
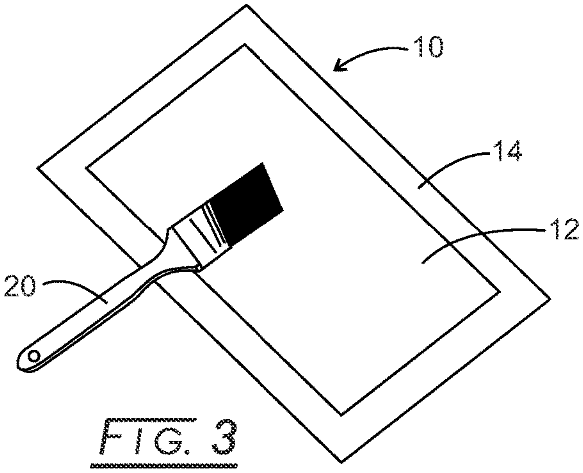
FIG. 3 is an isometric of a small paint brush being placed on the novel bilayer wrap.
Figure 4:
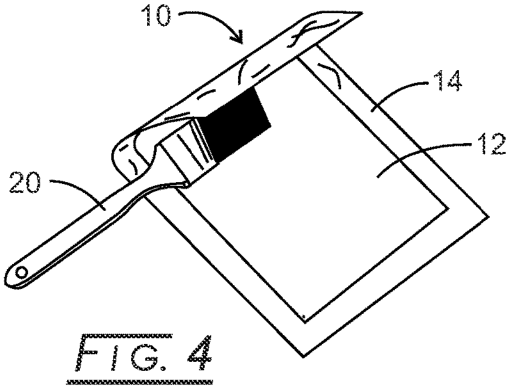
FIG. 4 is an isometric view of a paint brush being covered with the disclosed bilayer wrap.
Figure 5:
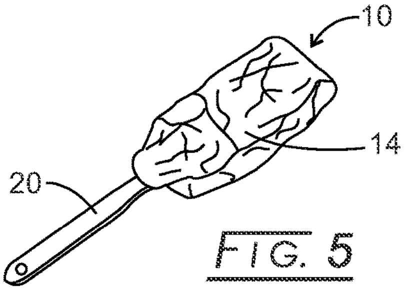
FIG. 5 is an isometric view of a paint brush with the disclosed bilayer wrap surmounting the bristles while the handle extends from the bilayer wrap.

The remaining drawings are photographs showing a bilayer bonded sheet used in a variety of additional paint applications, although the invention is not limited to only using in the paint field. Referring initially to FIGS. 3-5, the disclosed bilayer bonded sheet is seen having a paint brush placed on the inner absorbent layer (FIG. 3), in the process of being wrapped around a paint brush (FIG. 4), and finally completely crushed around the brush itself (FIG. 5). That paint brush can now be safety stored at the worksite or optionally placed in a refrigerator or freezer for additional protection. The bilayer bonded sheet will have been formed about the bush head to exclude any unbonded sites that would cause the paint to set (cure) and abrogate the efforts to wrap it.

Figure 6:
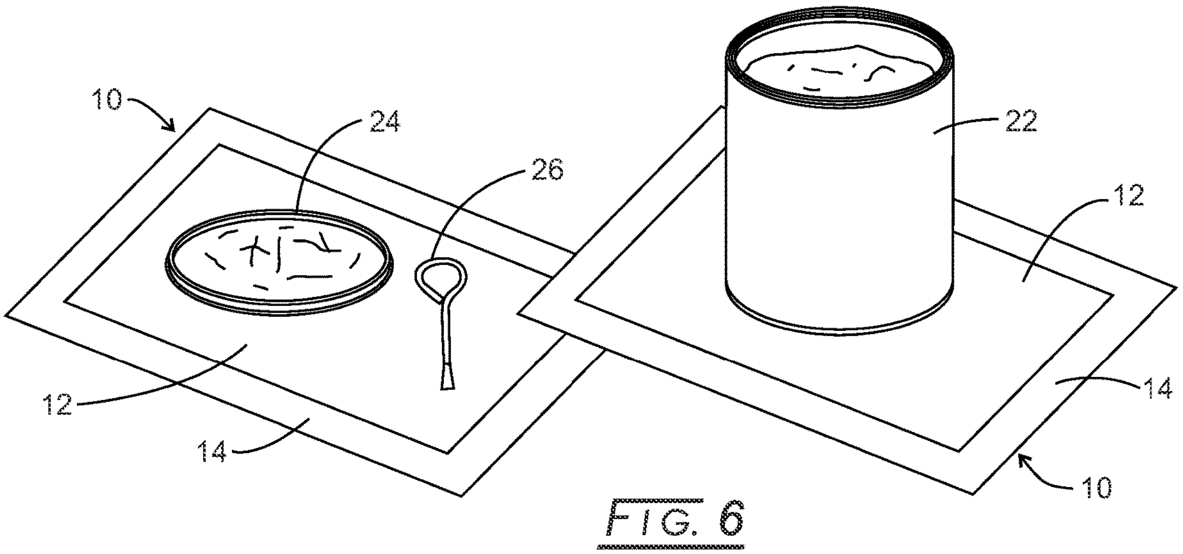
FIG. 6 is an isometric view showing an open paint can sitting on the bilayer wrap with its lid and paint can lid opener sitting close by on another sheet of bilayer wrap.

In FIG. 6, the bonded bilayer sheet is being used to safely set the open paint can and/or its lid without fear of paint being adhered to tables, floors, or other surface. If some of the paint inadvertently spills from the lid or can, it falls on the inner absorbent layer so that no harm is done.

In FIGS. 7 and 8, a paint stirrer is seen firstly being set upon the inner absorbent layer in FIG. 7. In FIG. 8, the bonded bilayer sheet has been "crushed" about the stirred for its storage and for protecting inadvertent contact of the paint on the stirred from messing up tables, floors, and like surfaces.

In FIGS. 9 and 10, initially the foil is seen in the process of being wrapped around a paint tray (FIG. 9) and then crushed to be in good contact with the edges of the paint tray (FIG. 10) so that any paint in the tray likely will not be spilled and can be stored for later use. The inner absorbent layer is best thoroughly wetted since the paint tray contains paint.

Figure 11:
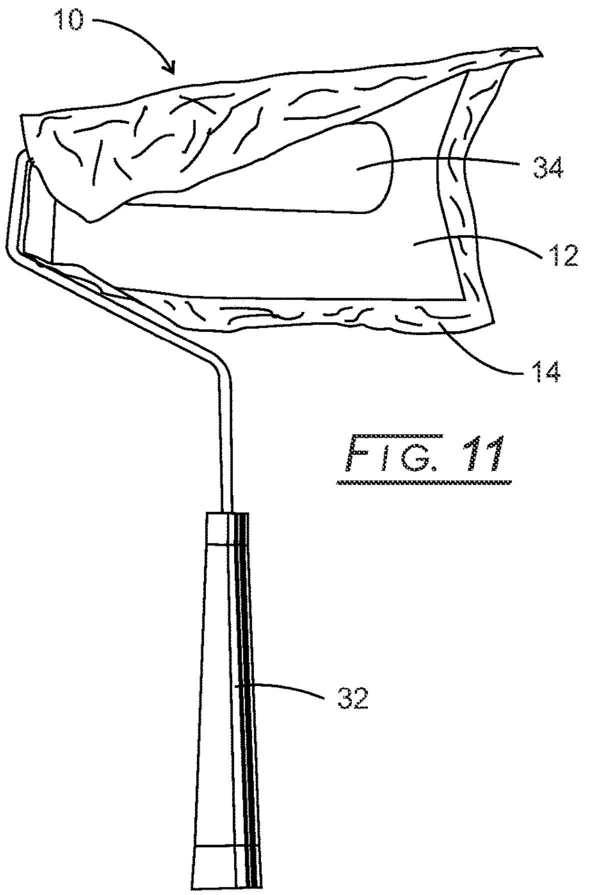
FIG. 11 is an isometric view of a paint roller and cover with a sheet of the bilayer wrap being secured about the roller cover.
Figure 12:
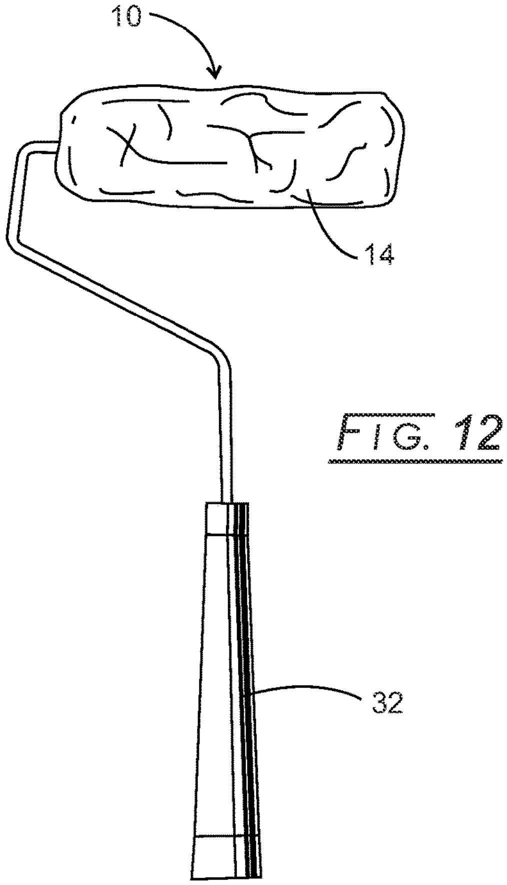
FIG. 12 is an isometric view of the paint roller of FIG. 11 with the bilayer wrap secured about the roller cover.

In FIGS. 11 and 12, initially the paint roller cover with handle attached is seen in the process of being wrapped about the roller cover (FIG. 11) and then fully wrapped in FIG. 12. The bonded bilayer wrap can be used for paint roller or other items without being separated from the rest of the instrument.

Figure 13:
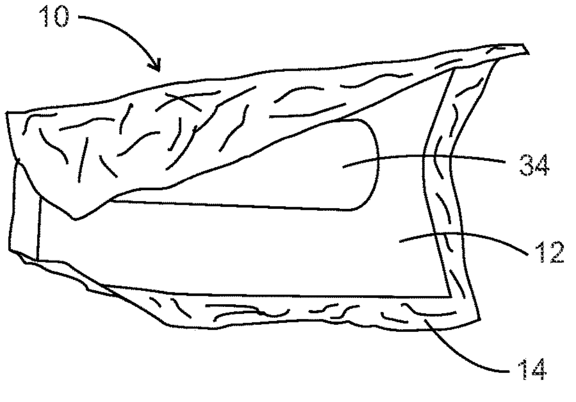
FIG. 13 is an isometric view of just a roller cover (handle assembly removed) with the bilayer wrap partially surmounting the roller cover.
Figure 14:
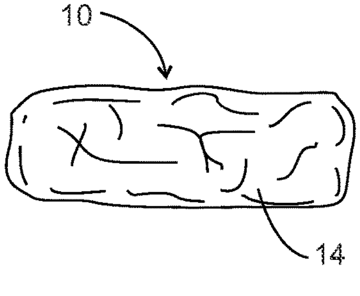
FIG. 14 is a photograph of the roller cover of FIG. 13 with the bilayer wrap secured about the roller cover.

In FIGS. 13 and 14, initially the paint roller cover without handle attached is seen in the process of being wrapped about the roller cover (FIG. 13) and then fully wrapped in FIG. 14. The bonded bilayer wrap can be used for paint roller cover or other items after having been separated from the rest of the instrument.

The drawings show but a few of the multitude of users for the novel bilayer wrap disclosed herein. Those additional multitude of uses also will be developed by users of the wrap as is necessary, desirably, or convenient for such users.

While the apparatus, system, and method have been described with reference to various embodiments, those skilled in the art will understand that various changes may be made and equivalents may be substituted for elements thereof without departing from the scope and essence of the disclosure. In addition, many modifications may be made to adapt a particular situation or material in accordance with the teachings of the disclosure without departing from the essential scope thereof. Therefore, it is intended that the disclosure not be limited to the particular embodiments disclosed, but that the disclosure will include all embodiments falling within the scope of the appended claims. In this application all units are in the American engineering system and all amounts and percentages are by weight, unless otherwise expressly indicated. Also, all citations referred herein are expressly incorporated herein by reference.

The invention claimed is:

1. A method for storing a paint instrument having a paint thereon, which comprises the steps of:

(a) wrapping the paint instrument with an absorbent layer; and (b) wrapping the absorbent layer with a metal foil that is hand formed about the absorbent layer such that the absorbent layer remains in place on the paint instrument.

2. The method of claim 1, wherein the paint is a latex paint and the absorbent layer is wetted with water.

3. The method of claim 1, wherein the paint is oil based and the absorbent layer is wetted with an organic solvent.

4. The method of claim 1, wherein the metal foil is bonded with the absorbent layer.

5. The method of claim 4, wherein the metal foil has been bonded with the absorbent layer with an adhesive.

6. The method of claim 1, wherein the paint instrument is one or more of a paint brush, a paint roller, or a paint roller cover.

7. The method of claim 1, wherein the absorbent layer comprises a cellulosic sheet.

8. The method of claim 1, where in the metal foil comprises an aluminum foil.

9. The method of claim 7, where in the metal foil comprises an aluminum foil.

10. A reusable paint applicator having a paint thereon, comprising:

(a) a paint applicator wetted with a paint thereon:

(b) an absorbent layer wrapped around the wetted paint applicator; and (c) a metal foil wrapped around the absorbent layer,
the bilayer wrapped paint applicator maintaining the paint applicator in condition for later use.

11. The reusable paint applicator of claim 10, wherein the paint is a latex paint and the absorbent layer optionally is wetted with water.

12. The reusable paint applicator of claim 10, wherein the paint is oil based and the absent layer optionally is wetted with an organic solvent.

13. The reusable paint applicator of claim 10, wherein the metal foil is bonded with the absorbent layer.

14. The reusable paint applicator of claim 13, wherein the metal foil has been bonded with the absorbent layer with an adhesive.

15. The reusable paint applicator of claim 10, wherein the paint applicator is one or more of a paint brush, a paint roller, or a paint roller cover.

16. The reusable paint applicator of claim 10, wherein the absorbent layer comprises a cellulosic sheet.

17. The reusable paint applicator of claim 10, where in the metal foil comprises an aluminum foil.

18. The reusable paint applicator of claim 16, where in the metal foil comprises an aluminum foil.

* * * * *